US008789139B2

(12) United States Patent
   Picard

(10) Patent No.: US 8,789,139 B2
(45) Date of Patent: Jul. 22, 2014

(54) AUTOMATED TEST TO TELL COMPUTERS AND HUMANS APART

(71) Applicant: Hewlett-Packard Development Company, L.P., Houston, TX (US)

(72) Inventor: Jean-Charles Picard, Villeneuve Loubet (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/739,557

(22) Filed: Jan. 11, 2013

(65) Prior Publication Data

US 2014/0181936 A1    Jun. 26, 2014

(30) Foreign Application Priority Data

Dec. 20, 2012   (EP) .................................... 12306639

(51) Int. Cl.
   *G06F 21/00*   (2013.01)
(52) U.S. Cl.
   USPC .................... 726/2; 726/17; 726/21; 380/200
(58) Field of Classification Search
   CPC .................................................... H04L 9/3271
   USPC ...................................................... 726/6, 2
   See application file for complete search history.

(56) References Cited

U.S. PATENT DOCUMENTS

| | | | |
|---|---|---|---|
| 7,891,005 B1 * | 2/2011 | Baluja et al. ..................... | 726/26 |
| 8,341,699 B2 * | 12/2012 | Billingsley et al. ............... | 726/2 |
| 8,397,275 B1 * | 3/2013 | Magdsick ......................... | 726/2 |
| 2008/0050018 A1 * | 2/2008 | Koziol ........................... | 382/187 |
| 2009/0187986 A1 * | 7/2009 | Ozeki .............................. | 726/21 |
| 2009/0235327 A1 * | 9/2009 | Jakobsson et al. ................ | 726/2 |
| 2009/0258687 A1 * | 10/2009 | Weichselbaum .................. | 463/9 |
| 2010/0251388 A1 * | 9/2010 | Dorfman ......................... | 726/29 |
| 2010/0306055 A1 | 12/2010 | Kolb | |
| 2011/0029902 A1 * | 2/2011 | Bailey ............................ | 715/764 |
| 2011/0197268 A1 * | 8/2011 | Ravikumar et al. ............... | 726/6 |
| 2011/0208716 A1 | 8/2011 | Liu et al. | |
| 2012/0233218 A1 * | 9/2012 | Ivey ............................... | 707/794 |
| 2012/0291122 A1 * | 11/2012 | Chow et al. ..................... | 726/19 |
| 2013/0007875 A1 * | 1/2013 | Jakobsson et al. ............... | 726/19 |

OTHER PUBLICATIONS

Gao, et al."A Novel Image Based CAPTCHA Using Jigsaw Puzzle", < http://dl.acm.org/citation.cfm?id=1932940 > on pp. 351-356, 2010.

Goldberg, et al; "A Global Approach to Automatic Solution of Jigsaw Puzzles", < http://sli.ics.uci.edu/pmwiki/uploads/Classes-2008F/Puzzle/2002goldberg.pdf > on pp. 82-87, Jun. 5-7, 2002.

McDaniel, et al; "Development of Embedded CAPTCHA Elements for Bot Prevention in Fischer Random Chess", < http://www.hindawi.com/journals/ijcgt/2012/178578/ > vol. 2012; Article No. 178578, Apr. 2012.

* cited by examiner

*Primary Examiner* — Morshed Mehedi

(57) ABSTRACT

Example embodiments disclosed herein relate to an automated test to tell computers and humans apart. Building blocks are assembled to generate an image for a test. When the building blocks are configured in at least one orientation, the image includes a line. One or more of the building blocks can be rotated to generate the at least one orientation. The test can be sent to a device. The test is not oriented in the at least one orientation.

18 Claims, 5 Drawing Sheets

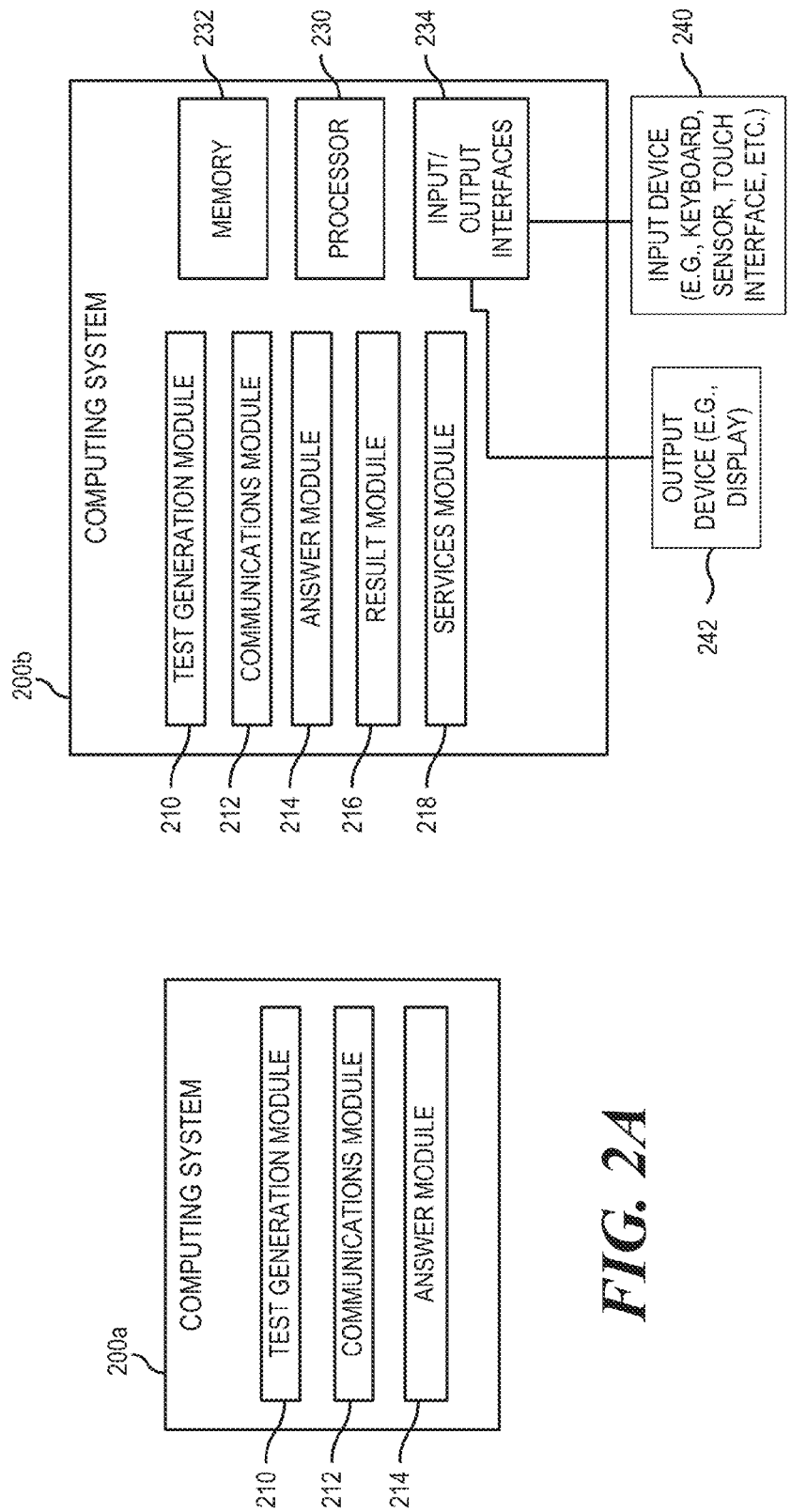

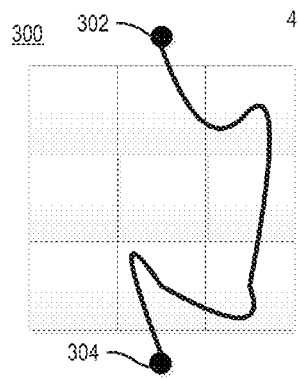
Fig.3: CORRECT ANSWER
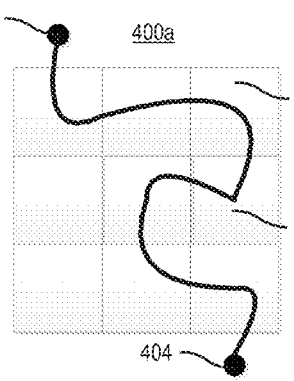
Fig.4A: CORRECT ANSWER
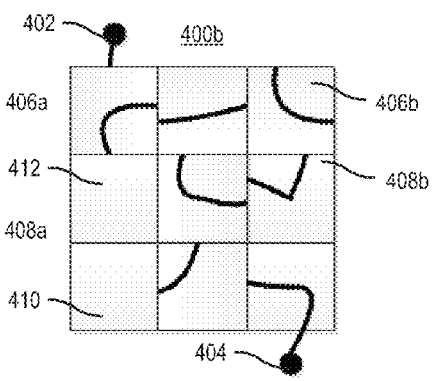
Fig.4B: VISUAL PUZZLE TO SOLVE
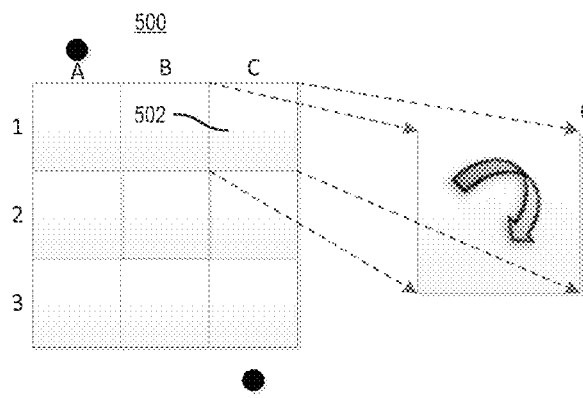
Fig.5: INTERNAL CODING
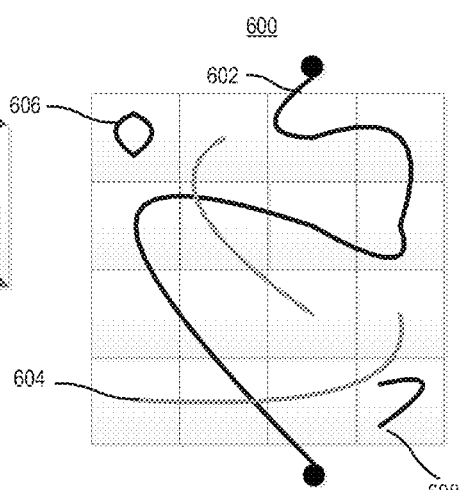
Fig.6: EXAMPLE OF MORE DIFFICULT VISUAL TEST

US 8,789,139 B2

AUTOMATED TEST TO TELL COMPUTERS AND HUMANS APART

BACKGROUND

Service providers and manufacturers are challenged to deliver quality and value to consumers, for example by providing services. Various services are provided to consumers via the Internet. As such, services may be provided by websites to client devices.

BRIEF DESCRIPTION OF THE DRAWINGS

The following detailed description references the drawings, wherein:

FIGS. 2A and 2B are block diagrams of computing systems capable of providing an automated test to tell computers and humans apart, according to various examples;

FIGS. 3, 4A, 4B, 5, and 6 are block diagrams of example user interfaces for an automated test to tell computers and humans apart, according to various examples;

DETAILED DESCRIPTION

Completely Automated Public Turing test to tell Computers and Humans Apart (CAPTCHA) is a challenge-response test in computing to ensure that the response is generated by a human being. These types of tests are designed to be easy for a computer to generate, but difficult for a computer to solve. If a correct solution is received, it can be presumed that the answer was entered by a human and not a computer. As such, this can be used as a defense against bot servers, spam, automatic tasks that a website accessible on the Internet wants to avoid (e.g., limitation of bandwidth usage for searches or downloads), etc. Further, it can secure form submissions, login creation, payments, comments on forums and blogs (e.g., to grant human operation and avoid spam and unwanted postings and/or submissions from an automated computer bot), etc.

Current tests include writing out letters/numbers from a distorted image that appears on a screen and asking a user to enter those letters in a response field. Distortions can make the letters and/or numbers curved to make it difficult for automatic recognition. However, this can be difficult for a user to decipher in addition to a computer to determine.

Accordingly, various embodiments disclosed herein relate to a novel approach for providing a logical and intuitive automated test to tell computers and humans apart. An image with a line (e.g., a curly line, a straight line, a squiggly line, etc.) can be modified and presented to a user. The image can be divided into pieces. In some examples, each of the pieces, when rotated by a certain degree, can remain flush with adjacent pieces. In one example, the system can be based on a grid composed of a square. A side (e.g., the top or left sides) of the grid can have a random starting point and another side (e.g., right or bottom side) of the grid can have a random ending point. In some examples, the system can draw a line between the two points with a Bezier style, have other curves, etc. In some examples, parameters can be set to ensure that the line crosses each square twice or that each square with a line in it is crossed only twice. Examples of such a drawing can be seen in FIGS. 3 and 4A. The starting and ending points can be placed randomly, thus need not be placed in the same place.

The system can present to the end user/computing device a different image e.g., FIG. 4B. This can be done by randomly rotating each square zero, one, or more times. The number of rotations can be random. This can be the grid the user has to solve before submitting a request. The user can use a mouse and/or other input mechanism to rotate each block. Then the user can submit the answer.

To avoid a brute force attack, the test can be changed if a submission of the path is wrong or multiple submissions are wrong (e.g., 3 submissions). Further, because each block need not be rotated, multiple answers can be true. A true answer can be one where the line is completed from start to finish.

Figure 1:
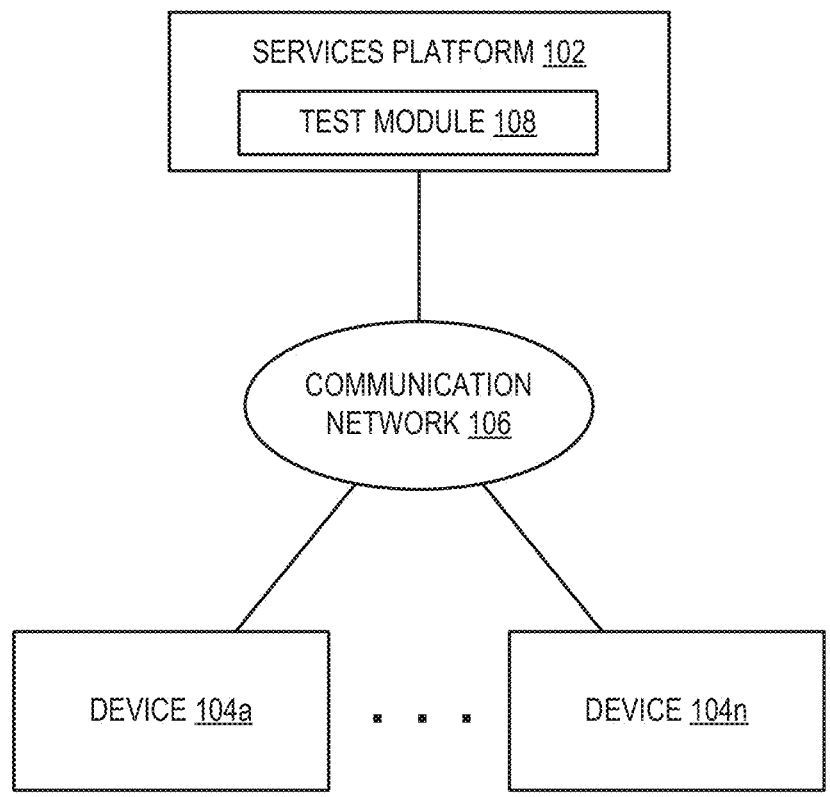
FIG. 1 is a block diagram of a system capable of using an automated test to tell computers and humans apart, according to one example.

FIG. 1 is a block diagram of a system capable of using an automated test to tell computers and humans apart, according to one example. The system 100 can include a services platform 102 that communicates with devices 104a-104n via a communication network 106. In certain examples, the services platform 102 and/or the devices 104a-104n are computing devices, such as servers, client computers, desktop computers, mobile computers, etc. In other embodiments, the devices 104a-104n can include special purpose machines. The services platform 102 and the devices 104 can be implemented via a processing element, memory, and/or other components.

The services platform 102 can provide services to one or more of the devices 104. Examples of services can include web application services, such as access to websites. For security or other reasons, a test module 108 can be used to present a test to a device 104 to ensure that a person is guiding the device. This can be to prevent a bot from performing unwanted actions (e.g., spam, use of bandwidth, etc.).

The test module 108 can be implemented using a computing system shown in FIGS. 2A and 2B. Further, the test module 108 can provide the test during communications with a device 104. Examples of user interfaces provided by the test are shown in FIGS. 3-6.

In one example, the device 104 communicates with the services platform 102 via the communication network 106. The test module 108 can provide the test as part of a website, web page, web application, etc. For example, the test can be implemented using flash features, HyperText Markup Language, Java, etc. In some examples, an administrator of a website may add the test module 108 in the form of a plugin to provide a test to ensure that users of the website are human.

In one example, the test can be provided in conjunction with a feature the user may want to use, for example, a search field, login fields, etc. In another example, the test can be provided as a separate test that the user would need to pass. For example, a web page can be provided with the test and if the device 104 passes, the web page goes to another address or page (e.g., the page the user wants to go to), the web page forwards to content desired (e.g., a download), etc.

As such, the test can be provided to the device 104 by the test module 108. The test can act, for example, in a client-server model with the device 104 being the client and the services platform 102 being the server. The test can be executed as further detailed in FIGS. 2A-7.

The test module 108 can generate and/or determine a building blocks of an image. When assembled together, the building blocks can be used to generate an image for the test. When configured in at least one orientation of the building blocks, the image can include a line with a start and an end as shown in FIGS. 3 and 4A. One or more of the building blocks can be rotated to generate the orientation. Further, the orientation can be changed by rotation. In the case of square building blocks, the rotation can be based on 90 degrees (e.g., 90, 180, 270, etc.). One or more of the building blocks can be rotated. In some examples, the amount of rotations can be random based on an algorithm. A test image can be generated based on the rotated image. The test image can be sent to the device 104.

The test image can be presented on the device 104. A user interface can be provided on the device 104 to allow a user to rotate the building blocks of the test image. A user of the device 104 can provide an answer. In one example, the answer can be correct or incorrect and can be based on how the building blocks are rotated. In some examples, multiple correct answers may be present, for example, if there are multiple ways to connect the line or one or more of the building blocks need not be used to connect the line. The device 104 can then provide an answer to the test module 108.

If the test passes, the desired content, information, etc. can be provided to the device. If the test fails, the device 104 may be directed to a failure page, requested to attempt the test again, or the like.

The communication network 106 can use wired communications, wireless communications, or combinations thereof. Further, the communication network 106 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 106 can be in the form of a direct network link between devices. Various communications structures and infrastructure can be utilized to implement the communication network(s).

By way of example, the services platform 102 and devices 104 communicate with each other and other components with access to the communication network 106 via a communication protocol or multiple protocols. A protocol can be a set of rules that defines how nodes of the communication network 106 interact with other nodes. Further, communications between network nodes can be implemented by exchanging discrete packets of data or sending messages. Packets can include header information associated with a protocol (e.g., information on the location of the network node(s) to contact) as well as payload information.

FIGS. 2A and 2B are block diagrams of computing systems capable of providing an automated test to tell computers and humans apart, according to various examples. Computing systems 200a, 200b include components that can be utilized to provide services (e.g., web content, searching services, point of interest services, database services, purchasing services, etc.). The respective computing systems 200a, 200b may be a notebook computer, a desktop computer, a tablet computing device, a wireless device, a server, a workstation, or any other computing device that can provide a service to another device. In one example, a computing system 200a may include a test generation module 210, a communications module 212, and an answer module 214. In other examples, the computing system may further include a result module 216 and a services module 218.

The computing system 200 may provide one or more services to devices via the services module 218 and/or communications module 212. In one example, the device can request web services and the services module 218 can provide web services as described above. Further, the computing system 200 can use a test as a decision maker to provide one or more of the services and/or to access certain information.

The test generation module 210 can generate and/or determine building blocks of an image. When assembled together, the building blocks can be used to generate an image for the test. In some examples, the image can first be determined and then the building blocks can be generated as an approach for splitting or partitioning the image. When configured in at least one orientation of the building blocks, the image can include a fine with a start and an end as shown in the examples of FIGS. 3 and 4A. These examples show the building blocks being squares. In these examples, the building blocks are set up in a grid pattern and there is a defined start and end to the line located outside of the grid. In other examples, the start and end need not be defined and the fine can span from one edge of the grid to another edge of the grid. Further, in certain scenarios, one or more of the building blocks can include a distraction item. In certain examples, a distraction item can be a line or set of fines. These lines may be colored differently to allow a user to identify the distractions as distractions. As noted above, other shapes can be used. In one example, any shape that when turned a particular number of degrees would still be flush with other shapes in a pattern can be used. For example, a set of regular hexagons can be used and set up in a hexagonal grid.

One or more of the building blocks can be rotated to generate the orientation. Further, the orientation can be changed by rotation. In the case of square building blocks, the rotation can be based on 90 degrees (e.g., 90, 180, 270, etc.). One or more of the building blocks can be rotated. In some examples, the amount of rotations can be random based on an algorithm. A test image can be generated based on the rotated image. Further, in some examples, the test image is not oriented in the at least one orientation that would include the connected line from start to end. The test image can be sent to the device via the communications module 212.

The test image can be presented on the device. A user interface can be provided on the device to allow a user to rotate the building blocks of the test image. A user of the device can provide an answer. In one example, the answer can be correct or incorrect and can be based on how the building blocks are rotated. In some examples, multiple correct answers may be present, for example, if there are multiple ways to connect the line or one or more of the building blocks need not be used to connect the line. Further, in some examples, the user interface can allow the user to rotate the building blocks using a mouse click. For example, a left mouse click can rotate a building block in a first direction. In another example, a right mouse click can rotate the building block in a second direction. Further, other inputs can be used to cause the rotation (e.g., a touch input, a keyboard input mapped to a particular building block, etc.). The rotation can correspond to a set number of degrees. Moreover, in some examples, answer information can be kept by a program executing on the device. The answer information may include, for example, rotation information for each of the one or more building blocks. Other approaches can be used to determine the answer information. Further, answer information may be sent in real-time. The device can then provide the answer information to an answer module 214 via the communications module 212 as input.

In one example, the answer module 214 can determine the answer provided by the answer information input. The result module 216 can then determine whether the answer corresponds to the at least one orientation. In some examples, the at least one orientation is the one or more correct answer possibilities to the test.

If the result module 216 determines that the answer corresponds to the at least one orientation, the device can be forwarded to a page corresponding with passing the test. The page may be a link to information or a download, a search, content submission, etc.

If the result module 216 determines that the answer does not correspond to the at least one orientation, the device is forwarded to a page corresponding with failing the test. In one example, the failure page may allow the user to retry the test and/or take another test. In another example, the failure page may link to another website.

A processor 230, such as a central processing unit (CPU) or a microprocessor suitable for retrieval and execution of instructions and/or electronic circuits can be configured to perform the functionality of any of the modules 210, 212, 214, 216, 218 described herein. In certain scenarios, instructions and/or other information, such as test content, can be included in memory 232 or other memory. Input/output interfaces 234 may additionally be provided by the computing system 200b. For example, input devices 240, such as a keyboard, a sensor, a touch interface, a mouse, a microphone, etc. can be utilized to receive input from an environment surrounding the computing system 200b. Further, an output device 242, such as a display, can be utilized to present information to users. Examples of output devices include speakers, display devices, amplifiers, etc. Moreover, in certain embodiments, some components can be utilized to implement functionality of other components described herein.

Each of the modules 210, 212, 214, 216, 218 may include, for example, hardware devices including electronic circuitry for implementing the functionality described herein. In addition or as an alternative, each module 210, 212, 214, 216, 218 may be implemented as a series of instructions encoded on a machine-readable storage medium of computing system 200 and executable by processor 230. It should be noted that, in some embodiments, some modules are implemented as hardware devices, while other modules are implemented as executable instructions.

FIGS. 3, 4A, 4B, 5, and 6 are block diagrams of example user interfaces for an automated test to tell computers and humans apart, according to various examples. FIG. 3 shows an example test image 300. The test image 300 has a starting point 302 and an ending point 304. Further, the test image 300 can be broken up into 9 building blocks in a grid image. As noted above, the building blocks can be rotated, for example, in accordance with an algorithm (e.g., an algorithm that includes a random function).

FIGS. 4A and 4B show examples of a user interface where FIG. 4A includes a test image 400a associated with a correct answer and FIG. 4B includes a modified test image 400b that can be provided to a user's device based on the correct answer. As such the modified test image 400b can represent a visual puzzle to solve that can be provided to a device that is being tested to determine whether there is a human user. The correct line or path can start at 402 and end at 404. In some examples, there is not a start or an end, but two end points.

One or more of the building blocks can be rotated. For example, building block 406a is set up in a correct orientation for passing the test while the building block 406b is rotated so that the line from 402 to 404 would not be completed with the building block 406b in that orientation. Some of the building blocks, for example, building blocks 408a, 408b, can be oriented in the same way for the test. As such, building block 408b need not be rotated to provide the correct orientation needed to pass the test. Further, some building blocks 410, 412 may not include a portion of the line and as such need to be rotated to complete the test successfully.

FIG. 5 shows an approach to keep track of the building blocks of the test. In this example, the test image 500 is split into building blocks based on a grid. This grid is labeled with A, B, C, 1, 2, 3. As such, each building block can be assigned a letter and number. For example, building block 502 can be labeled C1. Internal coding can be used to keep track of the building blocks and the orientation of the building blocks. For example, an orientation can be associated with each of the building blocks. In the case of a square building block, the orientation can be based on 90 degree angles. A clockwise rotation can be considered one 90 degree rotation, and a counterclockwise rotation can be considered one −90 degree rotation. Different shapes can be associated with different rotations and/or labels.

In one example, the device receiving the test can rotate the building blocks based on input. When the input is complete, the test can be submitted to the platform providing the test. The submitted information can include, for example, a number of rotations for each of the building blocks and/or another mechanism for providing orientation information of the building blocks to the platform.

FIG. 6 shows a more difficult virtual test example. Test image 600 can be considered a base test in a first orientation that passes the test. More than one orientation can be used to pass the test. This example shows a line that is formed in a 4×4 grid. The size of the grid makes the test more complex and difficult. Moreover, the grid can include distraction items. In some examples, distraction items can be considered marks that can be used to make it more difficult for a bot to find the correct path of line 602. Examples of distractions include distraction 604, distraction 606, and distraction 608. The distractions can be included in a single building block, such as distractions 606 and 608 or go across building blocks, such as distraction 604. In this case, distraction 604 can be shaded or colored differently than the line 602. This approach allows for making the determination of what can be considered part of the line easier for a human. As such, in one embodiment, when a distraction is included in multiple building blocks, it can be colored differently than the line 602.

In some examples, the size of the test on a particular platform can vary. As such, it can be more difficult for a programmer to program a bot to complete the test. For example, a test module 108 can be embedded in a server providing an application or website (e.g., as a plugin). The test module 108 can randomly determine the size of the test, both in image size as well as the amount of blocks. Further, in some examples, the building blocks may be squares or other regular shapes, while the whole test image is another shape, for example, a rectangle, an odd shape, etc.

Figure 7:
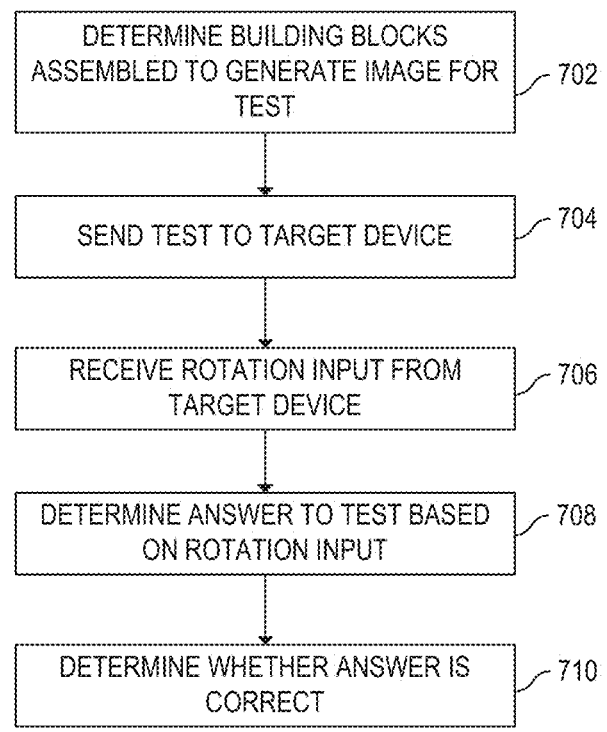
FIG. 7 is a flowchart of a method for an automated test to tell computers and humans apart, according to one example.

FIG. 7 is a flowchart of a method for an automated test to tell computers and humans apart, according to one example. Although execution of method 700 is described below with reference to computing system 200, other suitable components for execution of method 700 can be utilized (e.g., test module 108, computing platform, etc.). Additionally, the components for executing the method 700 may be spread among multiple devices. Method 700 may be implemented in the form of executable instructions stored on a machine-readable storage medium, such as storage medium 820, and/or in the form of electronic circuitry.

A computing system can provide services via the Internet. The services can be protected by a test to determine whether a human is controlling a device. Method 700 may initiate at 702, where the system can determine a plurality of building blocks assembled to generate an image for a test. As noted above, in some examples, the size of the test can vary. Further, as shown above, the building blocks may be set up in a grid pattern and may include distraction items. When configured in at least one orientation of the building blocks, the image includes a line with endpoints (e.g., a start and an end). One or more of the building blocks can be rotated to generate the at least one orientation.

At 704, the computing system can send the test to a target device. The target device may be a client device that is attempting to access one or more services or resource hosted by the computing system. The sending can be via the Internet. In some examples, the sending can be part of a communication between the computing system and an application (e.g., a web browser, bot, etc.) of the target device. The test is not oriented in the at least one correct orientation when sent to the target device.

The target device can receive the test and process the test. In one example, the test is processed by the application. A user can solve the test by rotating the building blocks. The test may be attempted to be processed by other computing programs, for example, bats. An answer to the test can be completed on the application and sent back to the computing system.

At 706, the computing system receives input to rotate the building blocks from the target device. In some examples, the input is transmitted/received in real-time. In other examples, the answer can be submitted and transmitted when complete.

At 708, the computing system determines the submitted answer from the input. The answer can be determined from determinations of what the input would do to the building blocks' orientation. At 710, the computing system determines whether the answer is correct. An answer can be considered correct if it corresponds to the at least one orientation. Multiple answers may be right for certain tests (e.g., if there are budding blocks that are not part of the line). If the answer is correct, the target device is forwarded to a web page that that is associated with a passing grade. If the answer is incorrect, the target device can be forwarded to a web page that is associated with a failing grade. In some examples, a target device that fails may be allowed to retake the test and/or take another test. In some examples, a second test can be made easier or harder. It may be beneficial to make the second test harder to protect against brute force attacks.

Figure 8:
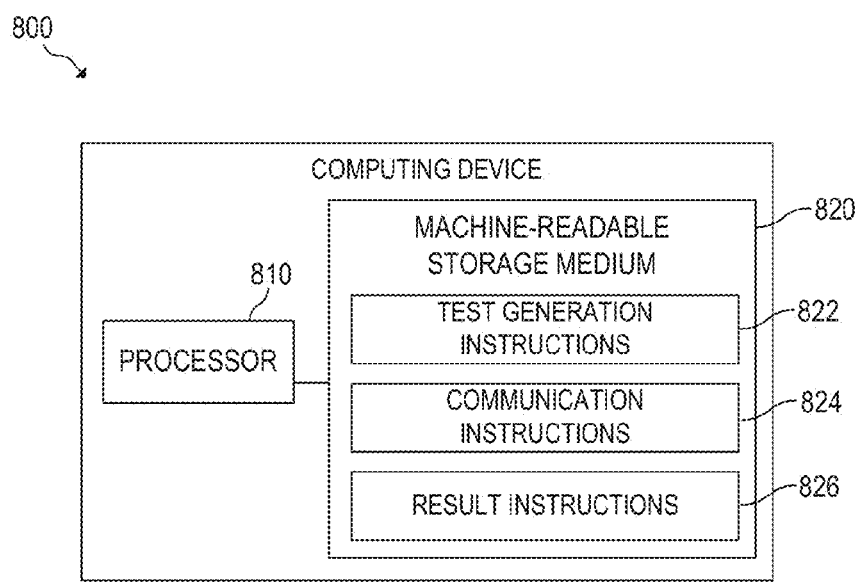
FIG. 8 is a block diagram of a computing device capable of providing an automated test to tell computers and humans apart, according to one example.

FIG. 8 is a block diagram of a computing device capable of providing an automated test to tell computers and humans apart, according to one example. The computing device 800 includes, for example, a processor 810, and a machine-readable storage medium 820 including instructions 822, 824, 826 for telling computers and humans apart. Computing device 800 may be, for example, a notebook computer, a slate computing device, a portable reading device, a wireless email device, a mobile phone, or any other computing device.

Processor 810 may be, at least one central processing unit (CPU), at least one semiconductor-based microprocessor, at least one graphics processing unit (GPU), other hardware devices suitable for retrieval and execution of instructions stored in machine-readable storage medium 820, or combinations thereof. For example, the processor 810 may include multiple cores on a chip, include multiple cores across multiple chips, multiple cores across multiple devices (e.g., if the computing device 800 includes multiple node devices), or combinations thereof. Processor 810 may fetch, decode, and execute instructions 822, 824, 826 to implement a test to tell computers and humans apart. As an alternative or in addition to retrieving and executing instructions, processor 810 may include at least one integrated circuit (IC), other control logic, other electronic circuits, or combinations thereof that include a number of electronic components for performing the functionality of instructions 822, 824, 826.

Machine-readable storage medium 820 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 820 may be encoded with a series of executable instructions for performing method 700 or other processes. For example, test module 108 and/or parts of the computing system 200 can be implemented using the instructions. Moreover, the instructions can be incorporated as a plugin to a website or page.

Test generation instructions 822 can be executed to generate the test as described above. Communication instructions 824 can be used to communicate with other devices, for example, via the Internet. As such, the test can be sent to a target device and an answer can be received via communications. The answer can be processed by executing the result instructions 826. If the answer is correct (there may be more than one correct answer for certain tests), the target device can be forwarded to a page corresponding to passing the test. If the answer is determined to be incorrect, the target device can be forwarded to a page corresponding with failing the test.

Advantages of using this approach for testing to determine whether a device is being controlled by a human include that the test is simple and fun. The test can be considered a simple logical game based on visualization, where a human mind is better than a machine. The game can be fun and less annoying than entering a code, which may be difficult for a human to read. The test can also be quick because each block need not be rotated to generate the line. Further, a reference model is not needed to be shown to the user. Complexity can be sized, for example, based on the number of building blocks, the size of the blocks. Moreover, noise can be added to the building blocks to add complexity, for example, colors, other lines, shapes, etc.

What is claimed is:

1. A computing system for providing an automated test to tell computers and humans apart comprising:
    a test generation module to generate a test image for a test, the test image comprising a plurality of building blocks configured in a first orientation,
        wherein, when the building blocks are configured in a second orientation, the image includes an unbroken line with a start and an end that are located (1) outside each of the building blocks, or (2) on an edge of at least one of the building blocks, and
        wherein one or more of the building blocks can be rotated to generate the second orientation;
    a communications module to send the test image to a device and receive input to rotate at least one of the plurality of building blocks,
        wherein the test image is not oriented in the second orientation; and
    an answer module to determine an answer from the input.

2. The computing system of claim 1, further comprising:
    a result module to determine whether the answer corresponds to the second orientation.

3. The computing system of claim 2, wherein if the result module determines that the answer corresponds to the second orientation, the device is forwarded to a page corresponding with passing the test.

4. The computing system of claim 2, wherein if the result module determines that the answer does not correspond to the second orientation, the device is forwarded to a page corresponding with failing the test.

5. The computing system of claim 1, wherein a shape of the building blocks is square and wherein a mouse click input on one of the building blocks is used to rotate the one building block.

6. The computing system of claim 5, wherein a left mouse click rotates the one building block in a first direction and a right mouse click rotates the one building block in a second direction.

7. The computing system of claim 6, wherein the building blocks are set up in a grid pattern.

8. The computing system of claim 1, wherein one or more of the building blocks includes a distraction item.

9. A non-transitory machine-readable storage medium storing instructions for providing an automated test to tell computers and humans apart that, if executed by at least one processor of a device, cause the device to:
generate a test image for a test, the test image comprising plurality of building blocks configured in a first orientation,
wherein, when the building blocks are configured in a second orientation, the image includes an unbroken line with a start and an end that are located (1) outside each of the building blocks or (2) on an edge of at least one of the building blocks, and
wherein one or more of the building blocks can be rotated to generate the second orientation;
send the test image to a target device, wherein the test image is not oriented in the second orientation;
receive input to rotate at least one of the building blocks;
determine an answer to the test from the input; and
determine whether the answer corresponds to the second orientation.

10. The non-transitory machine-readable storage medium of claim 9, further comprising instructions that, if executed by the at least one processor, cause the device to:
forward the target device to a page corresponding with passing the test if the answer is determined to correspond to the second orientation; and
forward the target device to a page corresponding to failing the test if the answer is determined to not correspond to the second orientation.

11. The non-transitory machine-readable storage medium of claim 9, wherein the shape of the building blocks is square, and wherein a click input on one of the building blocks is used to rotate the one building block.

12. The non-transitory machine-readable storage medium of claim 9, wherein the building blocks are set up in a grid pattern and one or more of the building blocks include a distraction item.

13. A method for providing an automated test to tell computers and humans apart comprising:
generating, at a computing platform, a test image for a test, the test image comprising a plurality of building blocks configured in a first orientation,
wherein, when the building blocks are configured in a second orientation, the image includes an unbroken line with two endpoints that are located (1) outside each of the building blocks, or (2) on an edge of at least one of the building blocks, and
wherein one or more of the building blocks can be rotated to generate the second orientation;
sending the test image to a target device, wherein the test image is not oriented in the second at orientation when sent to the target device;
receiving input to rotate at least one of the building blocks from the target device;
determining an answer to the test from the input; and
determining whether the answer corresponds to the second orientation.

14. The method of claim 13, further comprising:
forwarding the target device to a web page based on whether the answer corresponds to the second orientation.

15. The method of claim 13, wherein the building blocks are set up in a grid pattern and one or more of the building blocks include a distraction item.

16. The method of claim 15, wherein at least a portion of the distraction item and a portion of the line are included in the same building block.

17. The computing system of claim 1, wherein:
the plurality of building blocks includes a first building block and a second building block; and
the first building block is rotated without rotating the second building block to generate the second orientation.

18. The computing system of claim 1, wherein generating the test image comprises:
partitioning a starting image into the plurality of building blocks; and
rotating at least one of building blocks to generate the first orientation.

* * * * *

UNITED STATES PATENT AND TRADEMARK OFFICE
CERTIFICATE OF CORRECTION

| | |
|---|---|
| PATENT NO. | : 8,789,139 B2 |
| APPLICATION NO. | : 13/739557 |
| DATED | : July 22, 2014 |
| INVENTOR(S) | : Jean-Charles Picard |

It is certified that error appears in the above-identified patent and that said Letters Patent is hereby corrected as shown below:

In the Claims:

In column 9, line 26, in Claim 9, after "comprising" insert -- a --.

In column 9, line 32, in Claim 9, delete "blocks" and insert -- blocks, --, therefor.

In column 10, line 21, in Claim 13, after "second" delete "at".

Signed and Sealed this
Eighteenth Day of November, 2014

Michelle K. Lee
*Deputy Director of the United States Patent and Trademark Office*